(12) United States Patent
Fröhlich et al.

(10) Patent No.: US 11,921,572 B1
(45) Date of Patent: Mar. 5, 2024

(54) DEGRADATION ASSESSMENT FOR A 5-DIMENSIONAL TWIN FRAMEWORK

(71) Applicant: Dell Products L.P., Round Rock, TX (US)

(72) Inventors: Herberth Birck Fröhlich, Florianópolis (BR); Vinicius Michel Gottin, Rio de Janeiro (BR)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 17/937,264

(22) Filed: Sep. 30, 2022

(51) Int. Cl.
*G06F 11/00* (2006.01)
*G06F 11/07* (2006.01)

(52) U.S. Cl.
CPC ........ *G06F 11/079* (2013.01); *G06F 11/0721* (2013.01)

(58) Field of Classification Search
CPC ............................ G06F 11/079; G06F 11/0709
USPC ....................................................... 714/1–57
See application file for complete search history.

(56) References Cited

U.S. PATENT DOCUMENTS

| | | | |
|---|---|---|---|
| 2019/0294978 A1* | 9/2019 | Sachs | G06N 5/022 |
| 2020/0265329 A1* | 8/2020 | Thomsen | G05B 13/044 |
| 2021/0140290 A1* | 5/2021 | Eslinger | E21B 43/128 |
| 2021/0294946 A1* | 9/2021 | Hendriks | G06F 30/27 |
| 2022/0100182 A1* | 3/2022 | Mehrotra | G05B 19/41885 |
| 2022/0137612 A1* | 5/2022 | He | G05B 23/0221 |
| | | | 700/292 |

OTHER PUBLICATIONS

F. Tao, Q. Qi, L. Wang e A. Y. C. Nee, "Digital Twins and Cyber-Physical Systems toward Smart Manufacturing and Industry 4.0: Correlation and Comparison," Engineering, 2019.

* cited by examiner

*Primary Examiner* — Sarai E Butler
(74) *Attorney, Agent, or Firm* — Workman Nydegger

(57) ABSTRACT

One example method includes receiving input from each degradation module in a group of degradation modules, and each of the degradation modules operates to track degradation of a respective dimension of a digital twin, determining, using the input, the individual degradation of each of the dimensions of the digital twin, determining, using the individual degradations for the dimensions, an overall degradation for the digital twin as a whole, and identifying, and implementing in an entity represented by the digital twin, a remedial action corresponding to one of the individual degradations.

20 Claims, 5 Drawing Sheets

DEGRADATION ASSESSMENT FOR A 5-DIMENSIONAL TWIN FRAMEWORK

FIELD OF THE INVENTION

Embodiments of the present invention generally relate to digital twins. More particularly, at least some embodiments of the invention relate to systems, hardware, software, computer-readable media, and methods, for identifying, and quantifying, degradation in the performance of a digital twin, and its components.

BACKGROUND

A 'digital twin' is an instance of a digital model that represents an entity, physical or not. This entity includes assets, processes and systems which are sufficient to meet the requirements of a set of use cases. There are categories of tools and methods that address all digital twin development and usage stages. The categories may include data services, integration, intelligence, user-experience, management and trustworthiness. Within trustworthiness, there are security, safety, reliability and resilience capabilities.

This trust is primarily driven by the reliability of a digital twin. According to the periodic table presented by the Digital Twin Consortium, reliability in this context is the ability of a digital twin or component to perform required functions under pre-established conditions over a specified period. This includes attributes such as performance levels, quality of service, functional availability and accuracy. Literature presents some ways to quantify degradation, but there are gaps for specific elements, and there is also a lack of approaches for quantifying degradation for the digital twin as a whole.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
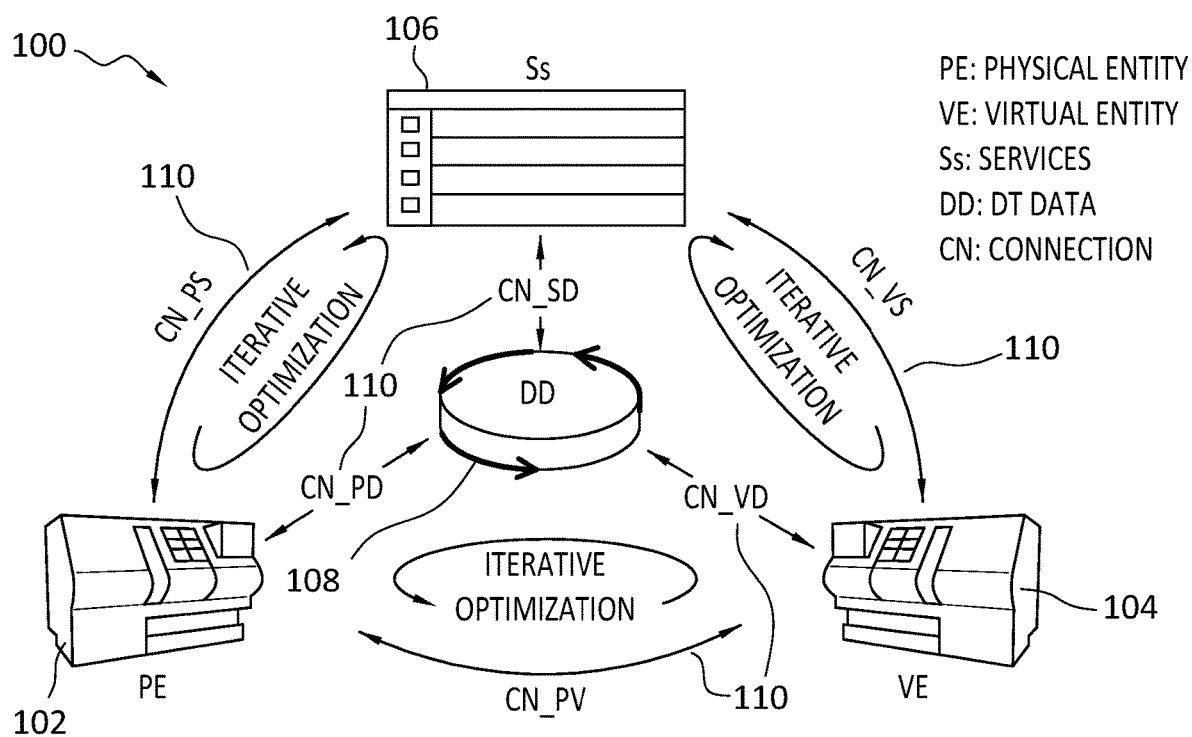
FIG. 1 discloses aspects of an example multi-dimensional digital twin framework.

Embodiments of the present invention generally relate to digital twins. More particularly, at least some embodiments of the invention relate to systems, hardware, software, computer-readable media, and methods, for identifying, and quantifying, degradation in the performance of a digital twin, and its components.

In general, some example embodiments of the invention may concatenate several calculations of individual component degradation, in a digital twin, into a single weighted summation metric. Some embodiments may comprise a degradation metric to address inference model degradation over time. An example embodiment may be based upon multi-dimensional digital twin framework. Examples of such dimensions may comprise physical entity, virtual entity, services, connection, and digital data.

In more detail, some embodiments may comprise degradation quantification modules embedded at various points in a 5-dimensional digital twin framework. These modules may use standard operation data from the digital twin that would already be available during its development such as, for example, calibration patterns, templates, latency, and models, as well as information from intelligent methods, such as AI models present in the service dimension. According to some embodiments, an overall degradation quantification method may comprise a combination of various modules.

In an embodiment, each of these modules may yield a metric that is a piece of a weighted summation. The degradation result, between 0 and 1, is the ongoing digital twin degradation status D, and the reliability R at a given moment may be calculated as 1−D. The higher the degradation, the lower the reliability of the digital twin at a given time.

An example embodiment may be implemented in two stages. The first stage is the offline stage, in which data from the digital development may be used to tune the degradation modules, and the second stage is an online stage, in which data may be received from the sensors, and from the inferences, so that reliability of the digital twin may be indirectly calculated using the modules.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment is that an overall degradation of a digital twin may be recognized, and quantified. An embodiment may, on an individual component basis, recognize and quantify degradation in multiple different components of a digital twin, and so enable troubleshooting and remedial action, with respect to the digital twin. An embodiment may provide for a reliable, and therefore trustworthy, digital twin. An embodiment may operate as a warning system to the replacement of individual digital twin components by yielding each component degradation separately. Further, an embodiment may inform pricing mechanisms, to help sellers to price digital twin offerings, and to help stakeholders understand levels-of-service of a digital twin. Finally, an embodiment may address the reliability of a digital twin in such a way as to real time monitoring and component observation. Various other advantages of example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Aspects of Some Example Embodiments

A.1 Overview

Some embodiments of the invention comprise degradation quantification modules embedded at various points in a multi-dimensional digital twin framework. These modules may use standard operation data from the digital twin that may already be available during its development. Such data may include, for example, calibration patterns, templates, latency, and models, as well as information provided by intelligent methods, such as by AI (artificial intelligence) models that may be present in the service dimension. According to some embodiments, the overall degradation quantification method may comprise a combination of various modules, examples of which may include:

(1) calibration of sensors and measurement systems: customizable system to calculate calibration deadlines;
(2) data acquisition stability (connection): signal availability;
(3) inference tools (intelligent methods): stability assessment;
(4) latency measurement: communication quality and speed;
(5) data governance: data quality; and
(6) physical and virtual similarity: similarity between the physical and virtual entity.

Each of these modules may yield a respective metric that is a piece of an overall weighted summation, or degradation result, for the digital twin as a whole. The degradation result, measured between 0 and 1 in some embodiments, is the ongoing digital twin degradation status D, and the reliability R of the digital twin at a given time may be calculated as 1−D. In general, the higher the degradation, the lower the reliability at a given time.

With this context, some embodiments may comprise two stages. The first stage may be an offline stage, in which data from the digital development is used to tune the degradation modules of the digital twin. The second stage may be an online stage, in which data is received from the sensors, and from the inferences, so that reliability of the digital twin may be indirectly calculated using the modules.

A.2 Degradation Dimensions and Modules of an Example Digital Twin

Following is a brief introduction of each of the degradation dimensions that may be present in a digital twin. Particularly, in an embodiment, there may a total of six degradation dimensions, and those dimensions may be related to the 5-dimensional twin framework disclosed in F. Tao, Q. Qi, L. Wang e A. Y. C. Nee, "*Digital Twins and Cyber-Physical Systems toward Smart Manufacturing and Industry* 4.0*: Correlation and Comparison,*" *Engineering,* 2019 ("Tao"), which is incorporated herein in its entirety by this reference.

An example digital twin 100 that implicates various degradation dimensions is disclosed in FIG. 1. Each of the dimensions, which may relate to one or more respective aspects of the digital twin 100, may, under various circumstances and conditions, be susceptible to one or more forms of degradation in terms of their performance. The following example combination of digital twin dimensions is presented only by way of example, and is not intended to limit the scope of the invention in any way. Additional, or alternative, dimensions may be included in some embodiments.

As shown, the multi-dimensional digital twin 100 may comprise a physical dimension, an example of which is a physical entity (PE) 102. An example physical entity 102 may comprise various subsystems and sensory devices such as, but not limited to, dynamic systems, control systems, hydraulic systems, sensors, design, manufacturing, mechanical systems and components, and electrical/electronic systems and components.

Another dimension of the digital twin 100 may comprise a virtual entity (VE) 104. The VE 104 may comprise a faithful mirror of the PE 102 and, as such, may comprise a geometry model, physics model, behavior model and rule models.

Embodiments of a digital twin 100 may comprise a services (Ss) dimension 106. In general, the services module 106 may aim to make the PE 102 work as expected, and may sustain the high-fidelity of the VE 104, with the PE 102, through the use of model parameters calibration. With respect to the PE 102, the services module 106 may include monitoring, state prediction, and optimization, for example. As it relates to the VE 104, the services module 106 may include, for example, a construction service, a calibration service, and test service models.

As further indicated in FIG. 1, the digital twin 100 may comprise a Digital Twin Data (DT) dimension 108. The DT data 108 may include data from the PE 102, VE 104, Ss 106, domain knowledge, and combinations of any of the foregoing.

Finally, the digital twin 100 may comprise a Connections (CN) 110 dimension. In general, the connections CN 110 may comprise any, and all, possible connections between the other modules Ss 106, DD 108, PE 102, and VE 104. Any, or all, of the connections CN 110 may be bidirectional.

Figure 2:
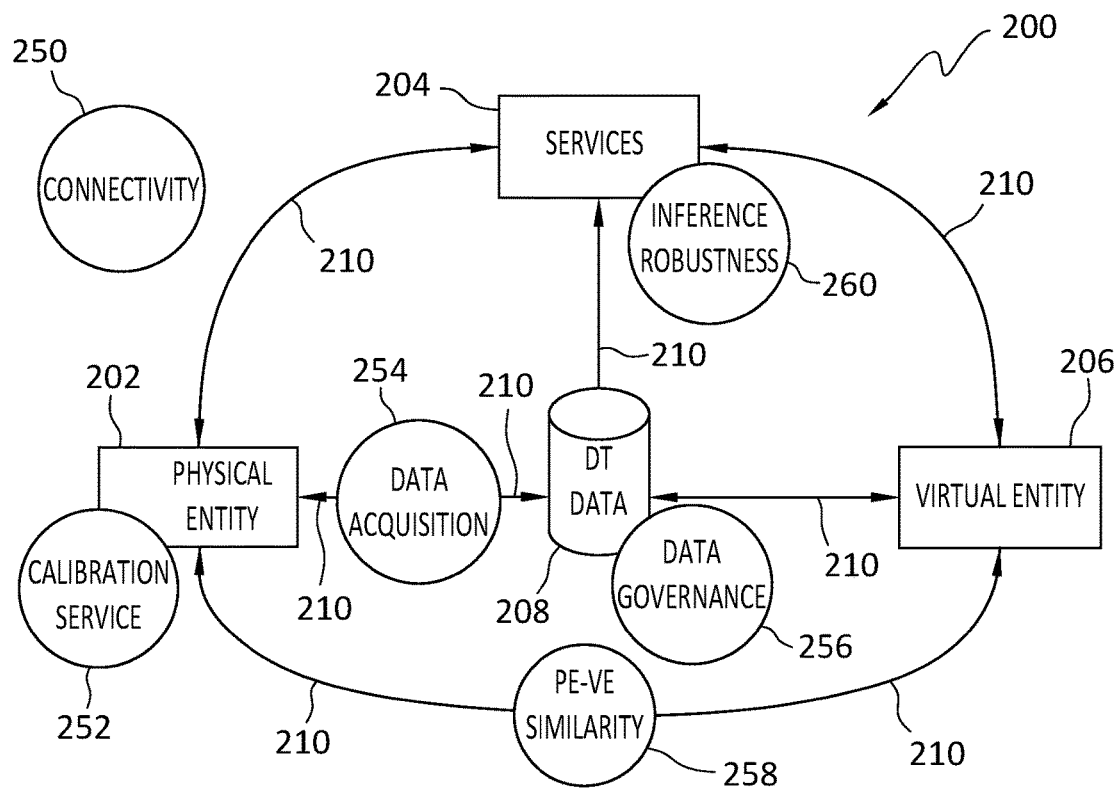
FIG. 2 discloses aspects of an example multi-dimensional digital twin framework and corresponding degradation modules.

With reference now to FIG. 2, the positioning of various degradation modules, or simply 'modules,' corresponding to dimensions of an example physical twin are disclosed. In general, each module may be operable to perform various operations, such as data collection and analysis for example, and calculations of various types, with respect to the dimension(s) and associated to which the module pertains.

In the example of FIG. 2, various example degradation modules are positioned in a system 200 that includes a physical entity 202, services 204, a virtual entity 206, data 208, and various connections 210 between and among the aforementioned elements. The modules in the example of FIG. 2 may comprise a connectivity module 250, a calibration service module 252, a data acquisition module 254, a data governance module 256, a PE-VE similarity module 258, and an inference robustness module 260.

In some embodiments, degradation modules such as those disclosed in FIG. 2 may be posteriorly concatenated to a single metric, that is, based on input from the modules, a single metric may be employed to quantify an overall degradation state of a system. One or more of metrics respectively generated by, or otherwise associated with, individual modules may require a priori data to establish a baseline for reference purposes. Some embodiments may rely on such data insofar as that data reflects the standard procedure of digital twin development. Examples of data include, but are not limited to, sensor calibration information, a training dataset, operational environment information, and a properly built virtual entity. Details of each module calculation are described below. In an embodiment, the output from each of degradation modules is between 0 and 1, unless stated otherwise.

A.2.1 Connectivity—$D_{Con}$

One example module that may be employed in an embodiment concerns connectivity. In general, the connectivity degradation may be related to communication speed and quality, in a system, in relation to established standards. Some embodiments may employ one module of this type positioned at each location where there is an exchange of information, such as the sending and receiving of packets for example. This module may comprise, or implement, a calculation using the following equation:

$$D\_con=(Packet\_loss+Ping\_norm)/2, \text{with}$$

$$Packet\_loss=(IncomingMessages-OutputMessages)/IncomingMessages$$

In this equation, an embodiment may consider that both instability in communication, as well as delays in communication, are indicative of degradation of the connectivity of a digital twin. The Ping_norm factor may be obtained, for example, by querying other devices on the network to determine whether there is a connection to it, or may be specified by a user. The Packet_loss represents the proportion of packets lost in a representative volume of data being transferred between two entities. While packet loss is typically given as a percentage value, the Ping_norm factor may be normalized between 0 and 1 using an interval provided by the user.

Moreover, in a typical embodiment, no amount of packet loss is allowed, but some ping amount, which may be defined by a user, can be tolerated. In that case, the Ping_norm factor may be normalized with respect to a minimum value comprising a threshold minimum delay (instead of zero). Note that a 'ping amount' may take the form of a ping threshold, or average delay in the time it takes to send a message between devices. The delay may be imposed by the connection between the devices. Thus, a ping amount above the ping threshold may indicate that the time to send the message between the devices and, thus, the connection between the devices, is not sufficiently fast. On the other hand, a ping amount below the ping threshold may indicate that the time to send the message between the devices and, thus, the connection between the devices, is sufficiently fast.

As noted elsewhere herein, each module may generate a degradation value, and those values may be weighted in some circumstances. With respect to connectivity degradation, for example, the connectivity may fluctuate from time to time within a system due to various circumstances. As such, the connectivity degradation may be weighted relatively lower than one or more of the other degradation measures.

A.2.2 Calibration Services—$D_{sen}$

A calibration services degradation value may indicate the relative delay between sensor calibrations. Typically, sensors, whose operation and readings may deviate over time, may undergo periodic revision to ensure that their readings are °w within a maximum accepted margin of error.

Figure 3:
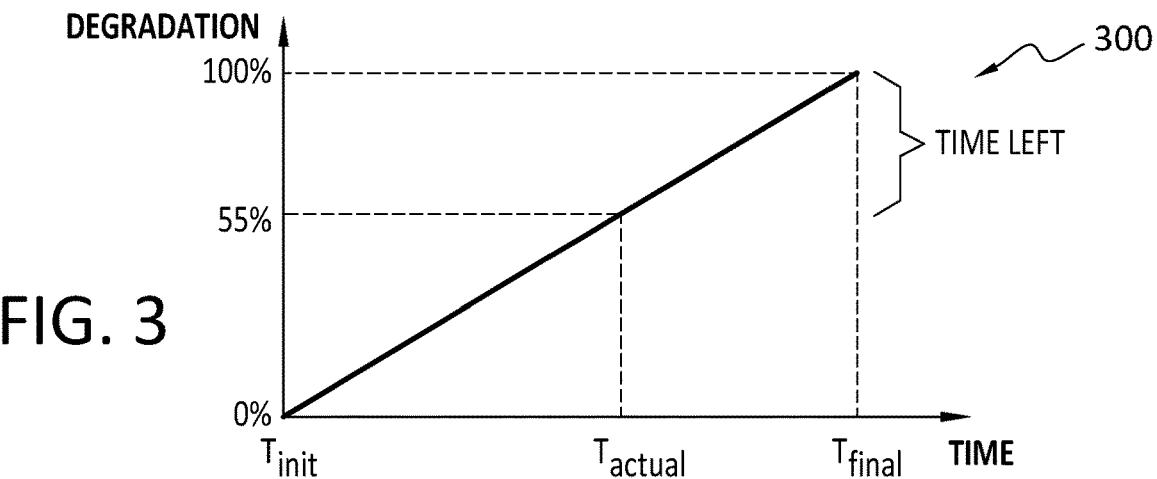
FIG. 3 discloses an example sensor calibration degradation interpolated as a straight line.

Thus, the degradation level of a single sensor s is related to the time T until the next calibration of the sensor is required. Some embodiments may assume that degradation to be, in this case, $T_{remaining}=T_{actual}-T_{init}$, and that such degradation progresses in a linear growth fashion. This range, as with the other degradation measures disclosed herein, may be normalized between 0 and 1. The range may then be stored as a value D(s), denoting the degradation level for that single sensor. FIG. 3 shows this scenario, where $T_{init}$ and $T_{final}$, in this example, may be provided by a subject matter expert responsible for sensor calibration and/or technical specifications of the sensors deployed. In the example plot 300 of FIG. 3, calibration degradation is disclosed as being interpolated in the form of a straight line, although non-linear calibration degradation progressions may be characteristic of other sensors.

Particularly, it is noted that this embodiment may assume a straightforward linear progression of the degradation as time goes by. This approach may be sufficient for many domains. However, if a subject matter expert, or other source, is able to provide a better estimation of the sensor drift over time, this function that interpolates between $T_{init}$ and $T_{final}$ may be arbitrarily replaced by an exponential degradation function, or other nonlinear function. This may apply where, for example, periods closer to the end have a higher degradation weight. Moreover, the function describing the sensor drift, and therefore the degradation progression, may be inferred based on data history, during an offline preprocessing stage.

Finally, in typical domains multiple sensors may be deployed. Thus, the value of $D_{sen}$ may be computed as an average of the sensor degradation values $D_{sen}=\Sigma s\in S\ D(s)$, where S denotes the set of all sensors. This average may be further weighted by a relative importance of each (set of) sensor(s) for the operation of the physical entity, if that is available from domain knowledge. For example, certain sets of redundant sensors may be assigned a lower weight than the primary sensors used for operational purposes.

A.2.3 Data Acquisition Stability—$D_{acq}$

The data acquisition stability degradation tracks the reliability of the sensors with respective to failures and noise. In one embodiment, $D_{acq}$ may comprise the average of the sum of the percentage of sensors in operation relative to the total number of sensors, and the noise level of the received signals relative to a known standard signal, as shown in this equation:

$$Dacq=((Sensors\_ok/Sensors\_total)+(Noise/(Noise\_allowed))/2$$

It may be reasonable, in some embodiments at least, to assume that some sensors might not be working at a certain time since there are tools to address missing values. Noise may also be addressed, but a high value of noise may compromise an inference process.

A.2.4 Data Governance—$D_{dgo}$

In an embodiment, the data governance degradation value $D_{dgo}$ tracks the quality of the data that will be sent to the inference models, based on the calculation of outliers and number of missing values. A baseline may be used in this case to set the maximum number of outliers and missing values allowed. More parameters may be introduced here, if necessary, if the appropriate baselines exist. $D_{dgo}$ may be calculated as follows:

$$D_{dgo}=((\text{Outliers}/(\text{Outliers\_allowed})+\text{MissingValues}/(\text{MissingValues\_allowed})))/2$$

As before, some embodiments may employ a preprocessing stage to determine the levels of robustness of the inference models applied. This can be performed by replaying the models with historical data, artificially inserting outliers and removing valid values in incremental fashion. Tracking the accuracy of the models in this fashion may enable an expert user to determine the appropriate baselines for the model to operate at a minimum accuracy threshold.

A.2.5 Physical and Virtual Similarity Measurement—$D_{pvs}$

The physical and virtual similarity measurement tracks the degradation of the specificity of the virtual entity with respect to the physical entity, that is, the ability of the virtual entity to faithfully reflect the actual workings of the physical entity, as opposed to the generality of the virtual entity, which relates to its ability to generate feasible but not-actually-observed behavior. Some embodiments may employ a similarity measure, as disclosed in Tao for example. The similarity between the reference and the PE time series, and between the reference and the VE time series may be measured using correlation based dynamic time warping (CBDTW). A flow chart of an example of this similarity measurement is disclosed in the method 400 of FIG. 4, in which dCBDTW is a PE-VE similarity measurement algorithm that leverages a similarity function to compute a similarity metric.

Figure 4:
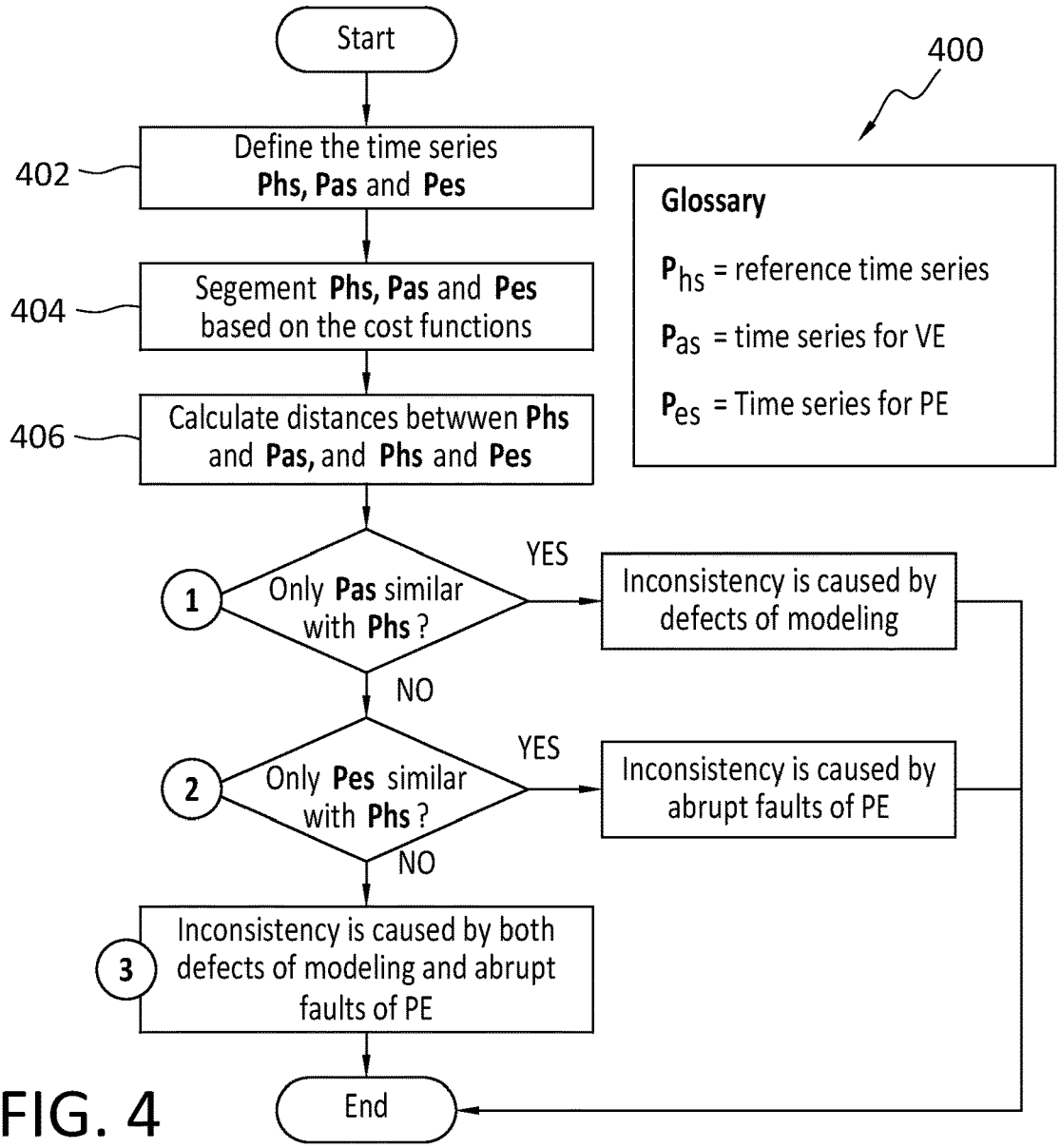
FIG. 4 discloses an example PE-VE similarity measurement leveraging a similarity function.

In general, the method 400 may begin with the definition 402 of the time series $P_{hs}$, $P_{as}$, and $P_{es}$. These time series may then be segmented 404 based on one or more cost functions. Next, the distances between $P_{hs}$ and $P_{as}$, and between $P_{hs}$ and $P_{es}$, may be calculated 406. Then, checks 1., 2. and 3. as shown below, may be performed. More particularly, the degradation $D_{psv}$ may be computed using the weighted sum of $P_{as}$ and $P_{es}$ similarities, as follows:

$$D_{pvs}=[W_v*\text{dCBDTW}(P_{hs},P_{as})+w_p*\text{dCBDTW}(P_{hs},P_{es})]/(W_v+W_p),$$

where the weights $w_v$ and $w_p$, may have three different possibilities, as shown in the example case of FIG. 4:
1. if only $P_{as}$ similar with $P_{hs}\rightarrow w_v=0.8$ and $w_p=0.2$;
2. if only $P_{es}$ similar with $P_{hs}\rightarrow w_v=0.1$ and $w_p=0.8$; and
3. inconsistency coming from both sources $\rightarrow w_v=0.5$ and $w_p=0.5$. In this way, the source(s) of any inconsistencies in the specificity of the virtual entity with respect to the physical entity may be determined. Note that the levels of 'similarity' between the reference time series $P_{hs}$, and $P_{as}$ and $P_{es}$, respectively, may be selected based on expert input, or another source. Moreover, the respective levels of similarity specified between $P_{hs}$ and $P_{as}$, and between $P_{hs}$ and $P_{es}$, may be different, due to different levels of acceptable variation or inconsistency.

A.2.6 Inference Models—$D_{ite}$

Figure 5:
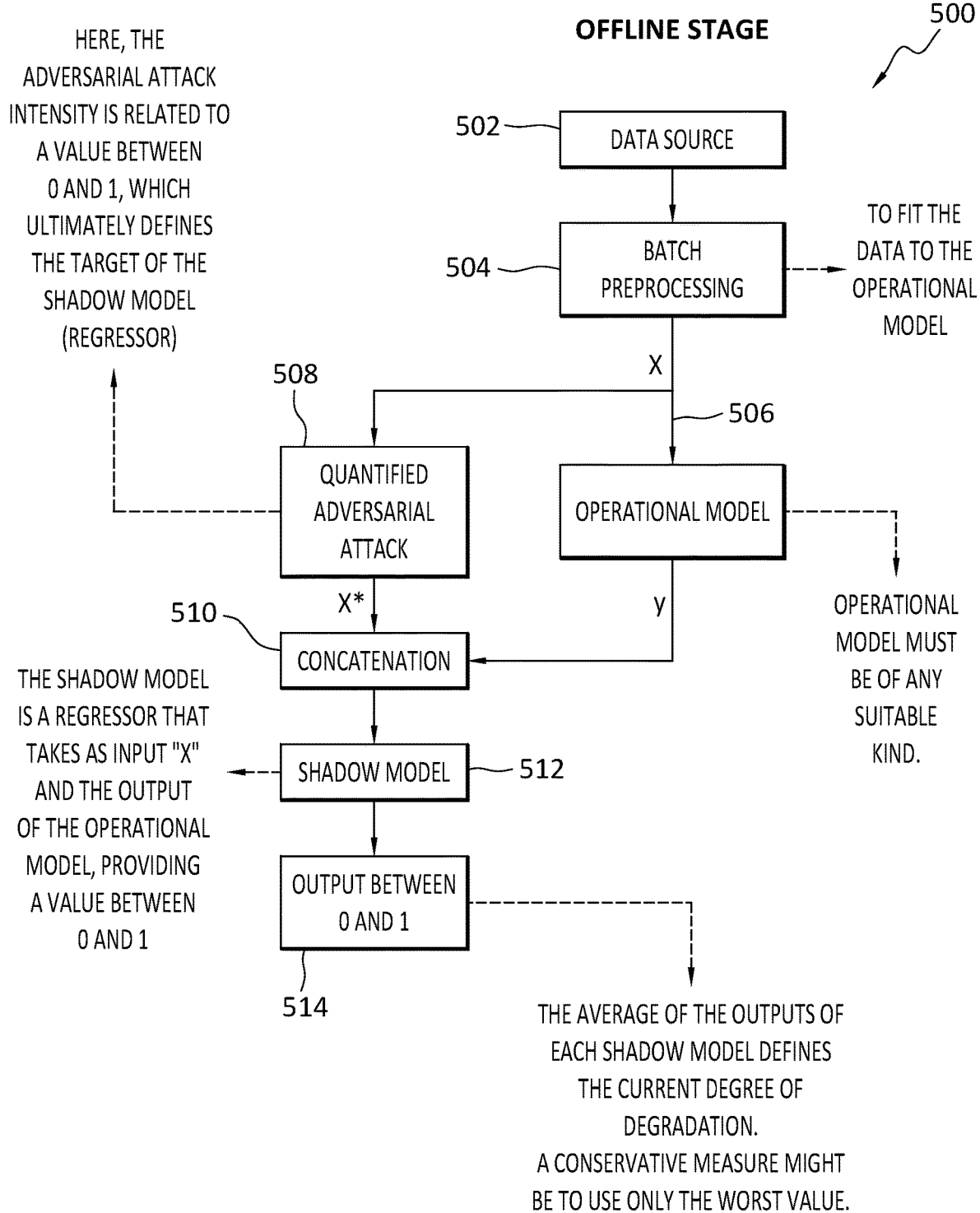
FIG. 5 discloses an example offline stage for training of a shadow model for degradation assessment.

This degradation parameter $D_{ite}$ is related to the robustness of the operational models that are being used by the digital twin. An embodiment may calculate the degradation of any number of models by running a shadow model trained using adversarial inputs and the output of each operational model. FIG. 5 discloses an example method 500 for an offline, or training, stage according to an embodiment. More particularly, FIG. 5 discloses training of a shadow model for a degradation assessment.

Consider an operational model, such as a classifier, a regressor, or a forecaster. First, data is received 502 and preprocessed 504, possibly in a batch mode, to match the input requirements, that is, to fit the data to the operational model. This data X may then be used to train 506 the operational model.

As well, this data X may be subjected 508 to adversarial attacks. In general, the intensity of the adversarial attack 508 may be related to a value between 0 and 1, and may ultimately define the target of the shadow model, or regressor. In more detail, a use may define a relatively high amount of adversarial-ness, and may relate this amount to 1. Further, a relatively lower, or nonexistent, adversarial-ness may be related to 0.

Various types of adversarial attacks 508 may be employed, one example of which is to add noise to the data X, but this attack can be of any kind that is measurable. Data X is submitted to a certain intensity of adversarial attack, yielding the modified data X*. A concatenation 510 may be used to obtain the output Y of the operation model, X*, and the target, which is between 0 and 1 according to the adversarial attack intensity. That is, the concatenation 510 may generate a table that includes X*, and also includes the output Y, of the operational mode, that was generated based on the use of X as the input. A shadow model, responsible for degradation assessment, may then be trained 512 with the information in the concatenated matrix. Particularly, the shadow model may be implemented as a regressor, and may take as input (1) X* and (2) Y. The shadow model may then, based on the differences between these two inputs, generate 514 an output degradation value between 0 and 1.

The average of the outputs of each shadow model in use by a digital twin may define the current degree of degradation of the inference model(s) in use by that digital twin. In an example of a relatively conservative approach, the current degree of degradation may be determined using the worst, rather than average, degradation value of the outputs of all the shadow models.

Note that during an online stage, an example of which is discussed below in connection with FIG. 6, a degradation assessment may use the pretrained shadow model to yield a value between 0 and 1 for each of the digital twin running operational models. This may only be possible if a shadow model was trained for that operational model.

Figure 6:
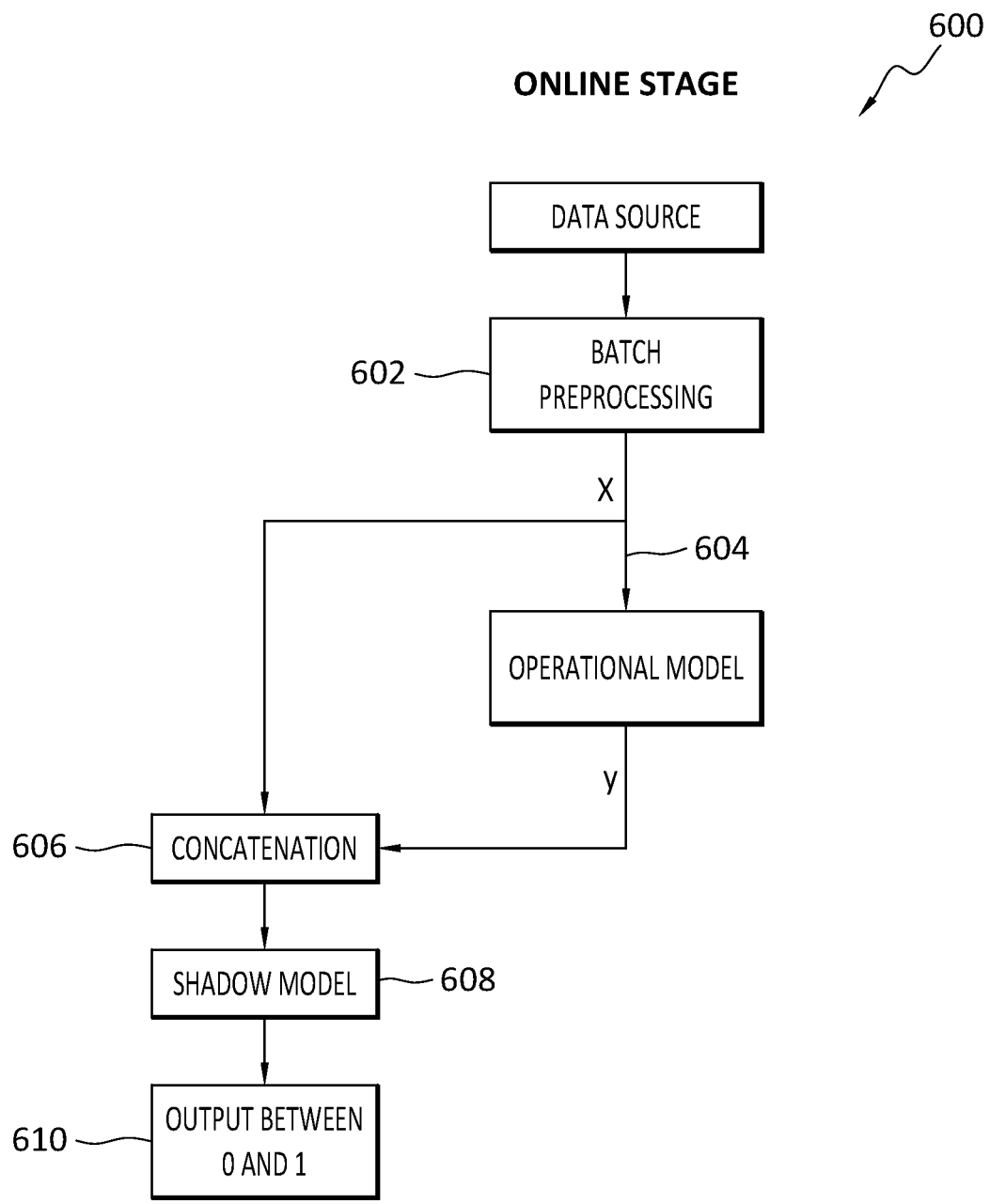
FIG. 6 discloses an example online stage using a shadow model to assess operational model degradation.

With attention now to FIG. 6, details are provided concerning a method 600 for an online stage in which a shadow model may be used to assess operational model degradation. In general, a degradation $D_{ite}$ may be calculated as the average of the output of all shadow models of the digital twin.

The method 600 may begin with the collection of data that may then be subjected to batch preprocessing 602. The preprocessed data X may then be output 604 to an operational model which may generate output Y based on the input data X. Then, X and Y may be concatenated 606, such as in a table. The concatenated data may then be input 608 to the shadow model, which may have been pretrained using the method 500 for example, and the shadow model may then generate an output 610 between 0 and 1. This output corresponds to the relative degradation of the operational model to which X was supplied 604 as input.

A.2.7 Aggregate Degradation Metric

The following weighted sum equation may be used to generate a single degradation metric applicable to a digital twin as a whole, where w represents weights, which may be provided by a developer or adapted by users according to business rules so that $D_{global}$ is between 0 and 1—note that the weights should add up to 1:

$$D global=(W_{sen}D_{sen}+W_{acq}D_{acq}+w_{pvs}D_{pvs}+W_{ite}D_{ite}+w_{con}D_{con}+W_{dgo}D_{dgo})/(W_{sen}+W_{acq}+W_{pvs}+W_{ite}+W_{con}+W_{dgo})$$

In one embodiment, each weight may be set to an identical value and, hence, all degradation aspects considered of equal importance. Some embodiments may employ a weighted average formulation as the weights allow more control in calculating the final degradation level, according to the aforementioned business rules.

Finally, the overall reliability level of the digital twin can be calculated as Reliability=1−$D_{global}$. With this reliability score, the stakeholders may track the degradation of each module and take timely action, if necessary. This reliability score may also provide a concrete quantification of the current state of a digital twin. Some embodiments of this approach may require a substantial amount of data for building the relevant models, however, and may not be robust to changes in the underlying physical environment or the digital twin usage, which may produce unreliable degradations.

B. Further Discussion

As disclosed herein, some embodiments of the invention may be effective in resolving one or more problems. For example, an embodiment may act as a warning system for the replacement of individual digital twin components by yielding each component degradation assessment separately. As another example, an embodiment may inform pricing mechanisms, to help sellers to price digital twin offerings, and to support stakeholders to understand levels-of-service provided by a digital twin. Finally, inasmuch as an embodiment addresses the reliability of a digital twin, real time monitoring and component observation may be enabled by that embodiment.

A further aspect of some embodiments is the implementation and use of a framework for determining and assessing a global degradation metric of a digital twin. This metric may relate to multiple different degradation modules, each comprising a mechanism for tracking the degradation of one aspect of a digital twin multi-dimensional framework. The global degradation metric may directly provide a reliability metric, which can be used for decision making, guided monitoring and business-specific purposes. An example embodiment may provide for the calculation of all the necessary degradation values.

As well, an embodiment may provide for a reliability metric. In particular, an embodiment may be provided for the calculation of the degradation of any inference model(s) employed in a digital twin. An approach according to one embodiment may leverage a shadow model, trained in a meta-learning way with quantified adversarial attacks. Note as well that an embodiment may provide the adaptation of a time-series based similarity measurement, or measurements, between the physical and virtual entities.

In contrast with the disclosed embodiments, while the general concept of service quality is known, especially in relation to a cyber physical system, there is presently no known method to quantify this quality in the digital twin domain. Thus, an embodiment may address this significant shortcoming by defining and providing some metrics for this context. Moreover, besides the combination of degradation values into a cohesive overall digital twin assessment, an embodiment is directed to an approach to track the degradation of inference models such as may be used in a digital twin C. Example Methods It is noted with respect to the disclosed methods, including the example method of FIGS. 5 and 6, that any operation(s) of any of these methods, may be performed in response to, as a result of, and/or based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

D. Further Example Embodiments

Following are some further example embodiments of the invention. These are presented only by way of example and are not intended to limit the scope of the invention in any way.

Embodiment 1. A method, comprising: receiving input from each degradation module in a group of degradation modules, and each of the degradation modules operates to track degradation of a respective dimension of a digital twin; determining, using the input, the individual degradation of each of the dimensions of the digital twin; determining, using the individual degradations for the dimensions, an overall degradation for the digital twin as a whole; and identifying, and implementing in an entity represented by the digital twin, a remedial action corresponding to one of the individual degradations.

Embodiment 2. The method as recited in embodiment 1, wherein the dimensions of the digital twin comprise any one or more of, a physical entity, a virtual entity, services, connections, and digital data.

Embodiment 3. The method as recited in any of embodiments 1-2, wherein determining the overall degradation comprises weighting the individual degradations, and calculating the overall degradation using the weighting of the individual degradations.

Embodiment 4. The method as recited in any of embodiments 1-3, wherein the digital twin comprises an inference model.

Embodiment 5. The method as recited in embodiment 4, wherein a degradation of the inference model is determined using a trained shadow model.

Embodiment 6. The method as recited in embodiment 5, wherein the shadow model was trained with output of an operational model, and with data generated using a quantified adversarial attack.

Embodiment 7. The method as recited in any of embodiments 1-6, wherein a reliability metric for the digital twin is calculated that is based on the overall degradation of the digital twin.

Embodiment 8. The method as recited in any of embodiments 1-7, wherein the digital twin comprises an inference model as one of the dimensions of the digital twin, and a degradation of the inference model is determined using one or both of (1) a distance between a reference time series and a time series for a virtual entity of the digital twin, and (2) a distance between a reference time series and a time series for a physical entity to which the digital twin corresponds.

Embodiment 9. The method as recited in any of embodiments 1-8, wherein one or more of the degradation modules comprises a respective tuned degradation module.

Embodiment 10. The method as recited in any of embodiments 1-9, wherein the input comprises data received from a sensor and data received from an inference model.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

E. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 7:
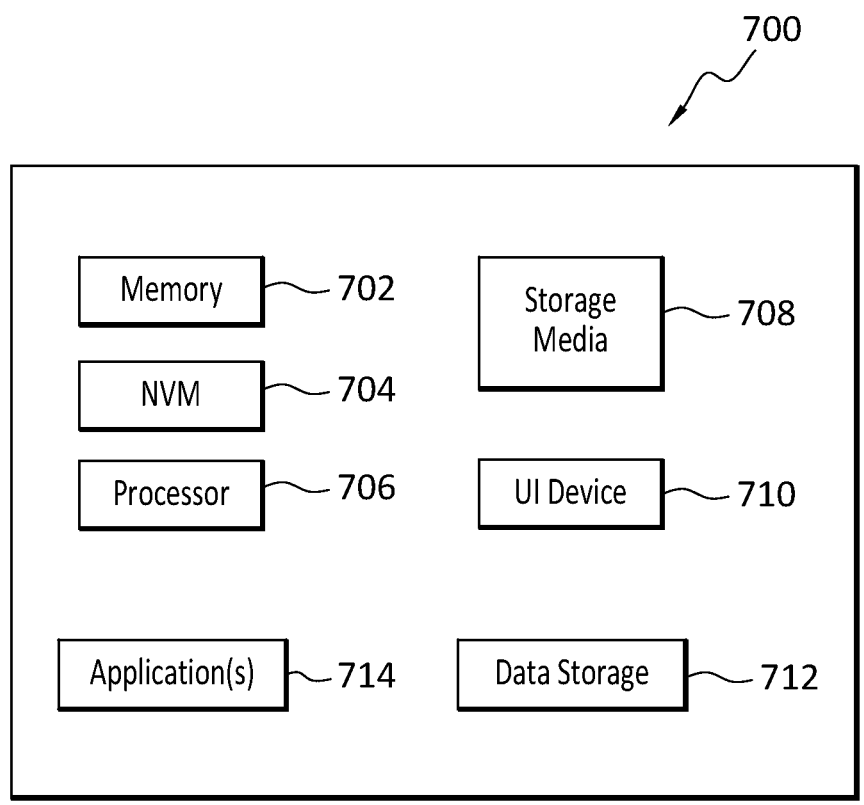
FIG. 7 discloses an example computing entity operable to perform any of the disclosed methods, processes, and operations.

With reference briefly now to FIG. 7, any one or more of the entities disclosed, or implied, by FIGS. 1-6 and/or elsewhere herein, may take the form of, or include, or be implemented on, or hosted by, a physical computing device, one example of which is denoted at 700. As well, where any of the aforementioned elements comprise or consist of a virtual machine (VM), that VM may constitute a virtualization of any combination of the physical components disclosed in FIG. 7.

In the example of FIG. 7, the physical computing device 700 includes a memory 702 which may include one, some, or all, of random access memory (RAM), non-volatile memory (NVM) 704 such as NVRAM for example, read-only memory (ROM), and persistent memory, one or more hardware processors 706, non-transitory storage media 708, UI (user interface) device 710, and data storage 712. One or more of the memory components 702 of the physical computing device 700 may take the form of solid state device (SSD) storage. As well, one or more applications 714 may be provided that comprise instructions executable by one or more hardware processors 706 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising: receiving input from each degradation module in a group of degradation modules, and each of the degradation modules operates to track degradation of a respective dimension of a digital twin; determining, using the input, an individual degradation of each of the dimensions of the digital twin; determining, using the individual degradations for the dimensions, an overall degradation for the digital twin as a whole; and identifying, and implementing in an entity represented by the digital twin, a remedial action corresponding to one of the individual degradations.

2. The method as recited in claim 1, wherein the dimensions of the digital twin comprise any one or more of, a physical entity, a virtual entity, services, connections, and digital data.

3. The method as recited in claim 1, wherein determining the overall degradation comprises weighting the individual degradations, and calculating the overall degradation using the weighting of the individual degradations.

4. The method as recited in claim 1, wherein the digital twin comprises an inference model.

5. The method as recited in claim 4, wherein a degradation of the inference model is determined using a trained shadow model.

6. The method as recited in claim 5, wherein the shadow model was trained with output of an operational model, and with data generated using a quantified adversarial attack.

7. The method as recited in claim 1, wherein a reliability metric for the digital twin is calculated that is based on the overall degradation of the digital twin.

8. The method as recited in claim 1, wherein the digital twin comprises an inference model as one of the dimensions of the digital twin, and a degradation of the inference model is determined using one or both of (1) a distance between a reference time series and a time series for a virtual entity of the digital twin, and (2) a distance between a reference time series and a time series for a physical entity to which the digital twin corresponds.

9. The method as recited in claim 1, wherein one or more of the degradation modules comprises a respective tuned degradation module.

10. The method as recited in claim 1, wherein the input comprises data received from a sensor and data received from an inference model.

11. A non-transitory storage medium having stored therein instructions that are executable by one or more hardware processors to perform operations comprising: receiving input from each degradation module in a group of degradation modules, and each of the degradation modules operates to track degradation of a respective dimension of a digital twin; determining, using the input, an individual degradation of each of the dimensions of the digital twin; determining, using the individual degradations for the dimensions, an overall degradation for the digital twin as a whole; and identifying, and implementing in an entity represented by the digital twin, a remedial action corresponding to one of the individual degradations.

12. The non-transitory storage medium as recited in claim 11, wherein the dimensions of the digital twin comprise any one or more of, a physical entity, a virtual entity, services, connections, and digital data.

13. The non-transitory storage medium as recited in claim 11, wherein determining the overall degradation comprises weighting the individual degradations, and calculating the overall degradation using the weighting of the individual degradations.

14. The non-transitory storage medium as recited in claim 11, wherein the digital twin comprises an inference model.

15. The non-transitory storage medium as recited in claim 14, wherein a degradation of the inference model is determined using a trained shadow model.

16. The non-transitory storage medium as recited in claim 15, wherein the shadow model was trained with output of an operational model, and with data generated using a quantified adversarial attack.

17. The non-transitory storage medium as recited in claim 11, wherein a reliability metric for the digital twin is calculated that is based on the overall degradation of the digital twin.

18. The non-transitory storage medium as recited in claim 11, wherein the digital twin comprises an inference model as one of the dimensions of the digital twin, and a degradation of the inference model is determined using one or both of (1) a distance between a reference time series and a time series for a virtual entity of the digital twin, and (2) a distance between a reference time series and a time series for a physical entity to which the digital twin corresponds.

19. The non-transitory storage medium as recited in claim 11, wherein one or more of the degradation modules comprises a respective tuned degradation module.

20. The non-transitory storage medium as recited in claim 11, wherein the input comprises data received from a sensor and data received from an inference model.

* * * * *